(12) United States Patent  
Horie

(10) Patent No.: US 8,724,920 B2  
(45) Date of Patent: May 13, 2014

(54) IMAGE PROCESSING DEVICE, PROGRAM RECORDING MEDIUM, AND IMAGE ACQUISITION APPARATUS

(75) Inventor: Gen Horie, Hachioji (JP)

(73) Assignee: Olympus Corporation, Tokyo (JP)

( * ) Notice: Subject to any disclaimer, the term of this patent is extended or adjusted under 35 U.S.C. 154(b) by 725 days.

(21) Appl. No.: 12/683,649

(22) Filed: Jan. 7, 2010

(65) Prior Publication Data

US 2010/0111409 A1 May 6, 2010

Related U.S. Application Data

(63) Continuation of application No. PCT/JP2008/062350, filed on Jul. 8, 2008.

(30) Foreign Application Priority Data

Jul. 10, 2007 (JP) ................................. 2007-181322

(51) Int. Cl.
*G06K 9/34* (2006.01)
*G06K 9/00* (2006.01)
*G06K 9/40* (2006.01)

(52) U.S. Cl.
USPC ........... 382/264; 382/164; 382/165; 382/167; 382/260; 382/266

(58) Field of Classification Search
None
See application file for complete search history.

(56) References Cited

U.S. PATENT DOCUMENTS

| | | | |
|---|---|---|---|
| 5,231,677 A | 7/1993 | Mita et al. | |
| 5,381,183 A * | 1/1995 | Ishizuka et al. | ............... 348/458 |
| 5,729,360 A | 3/1998 | Kita et al. | |
| 5,739,922 A | 4/1998 | Matama | |
| 6,754,398 B1 | 6/2004 | Yamada | |
| 2002/0163670 A1 | 11/2002 | Takahira | |

(Continued)

FOREIGN PATENT DOCUMENTS

| | | |
|---|---|---|
| JP | 61-157165 A | 7/1986 |
| JP | 09-22460 A | 1/1987 |

(Continued)

OTHER PUBLICATIONS

Saito, "Adaptable Image Interpolation with Skeleton-Texture Separation", Oct. 8, 2006, 2006 IEEE International Conference on Image Processing, pp. 681-684.*

(Continued)

*Primary Examiner* — Amir Alavi
*Assistant Examiner* — Kenny Cese
(74) *Attorney, Agent, or Firm* — Holtz, Holtz, Goodman & Chick, PC

(57) ABSTRACT

An image processing device includes a component separation section configured to separate an original image signal into a plurality of components including a first component that is a framework component and a second component obtained from a residue corresponding to the original image signal from which the first component has been excluded, an edge information acquisition section configured to obtain edge information from the first component included in the plurality of components, a fluctuation-component reduction section configured to reduce a fluctuation component at least of the second component included in the plurality of components, a parameter acquisition section configured to acquire a parameter for the fluctuation-component reduction section based on the obtained edge information, and a component synthesis section configured to synthesize the first component and the component other than the first component in which the fluctuation component has been reduced.

13 Claims, 14 Drawing Sheets

(56) References Cited

U.S. PATENT DOCUMENTS

2003/0007186 A1    1/2003  Suino et al.
2003/0218776 A1*  11/2003  Morimoto et al. ............. 358/2.1
2004/0119858 A1*   6/2004  Shimazaki .................... 348/252
2005/0123214 A1*   6/2005  Takahira ....................... 382/266
2008/0122953 A1*   5/2008  Wakahara et al. ............. 348/241
2008/0199099 A1*   8/2008  Michel et al. ................. 382/260

FOREIGN PATENT DOCUMENTS

| JP | 7-212611 A | 8/1995 |
|----|------------|--------|
| JP | 8-202870 A | 8/1996 |
| JP | 2001-57677 A | 2/2001 |
| JP | 2001-157057 A | 6/2001 |
| JP | 2002-300402 A | 10/2002 |
| JP | 2003-18403 A | 1/2003 |
| JP | 2004-213415 A | 9/2004 |
| JP | 2005-117549 A | 4/2005 |
| WO | WO2005/081542 A1 | 9/2005 |

OTHER PUBLICATIONS

International Preliminary Report on Patentability (in English) dated Jan. 26, 2010 in parent International Application No. PCT/JP2008/062350.

International Search Report issued in Int. Appln. No. PCT/JP2008/062350 dated Sep. 9, 2008.

Yuki Ishii et al; The Translations of The Institute of Electronics, Information and Communication Engineers, Jul. 1, 2007; vol. J90-D; No. 7, pp. 1682-1685.

* cited by examiner

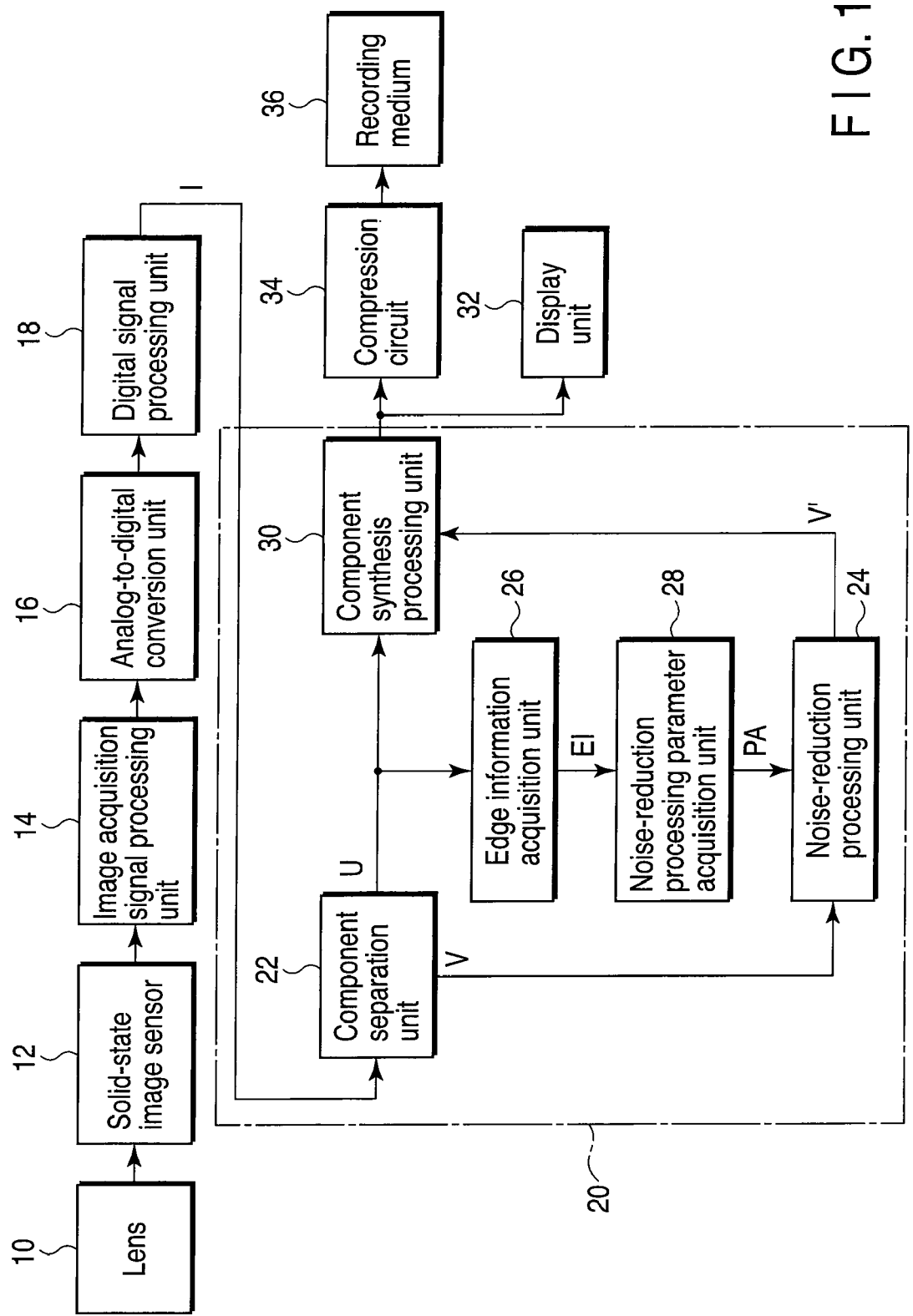
F I G. 1

| −1 | −2 | −1 |
|---|---|---|
| 0 | 0 | 0 |
| 1 | 2 | 1 |

FIG. 3A

| −1 | 0 | 1 |
|---|---|---|
| −2 | 0 | 2 |
| −1 | 0 | 1 |

FIG. 3B

| 1 | 4 | 6 | 4 | 1 |
|---|---|---|---|---|
| 2 | 8 | 12 | 8 | 2 |
| 1 | 4 | 6 | 4 | 1 |

| 1 | 2 | 1 |
|---|---|---|
| 4 | 8 | 4 |
| 6 | 12 | 6 |
| 4 | 8 | 4 |
| 1 | 2 | 1 |

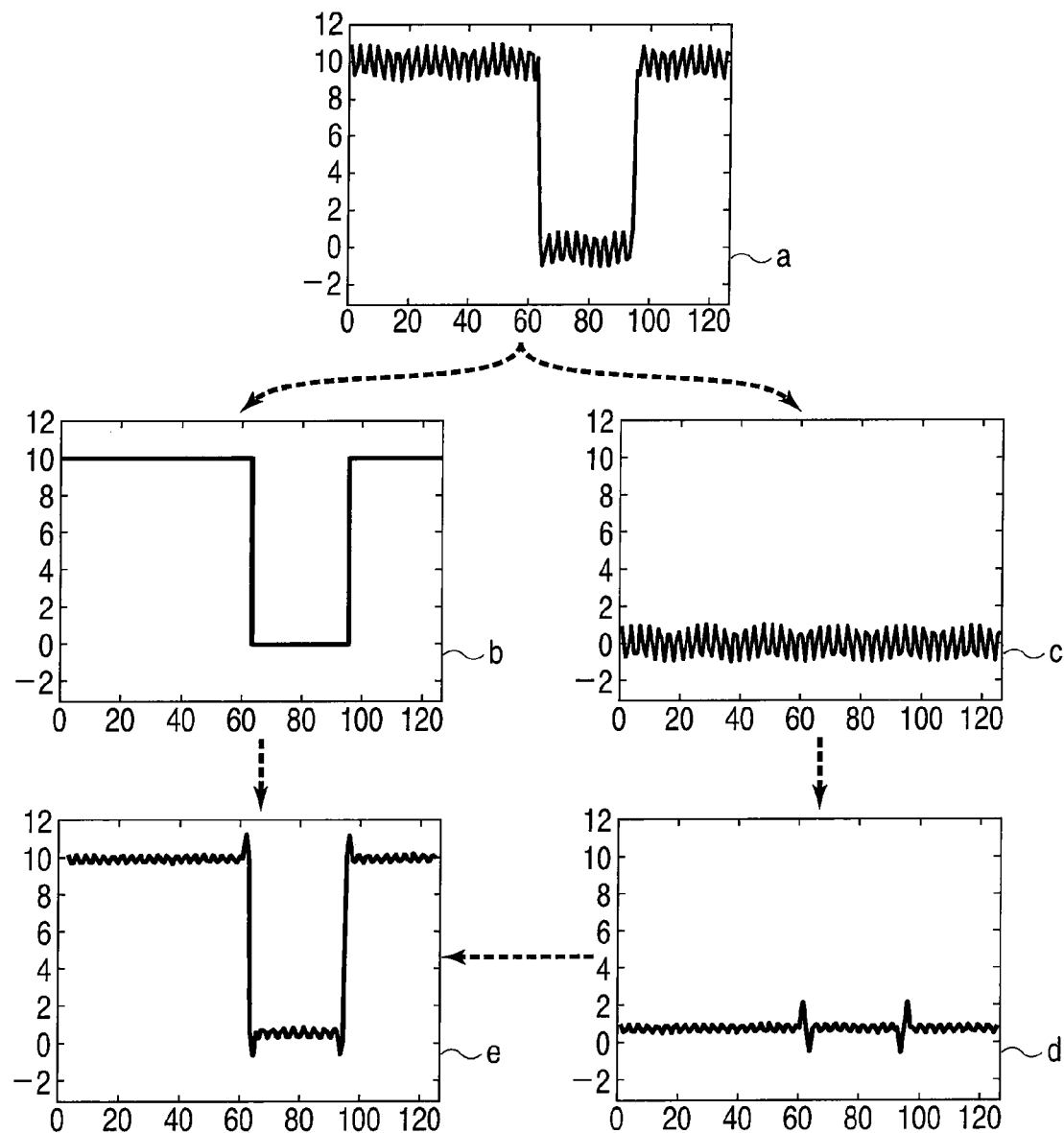
F I G. 7

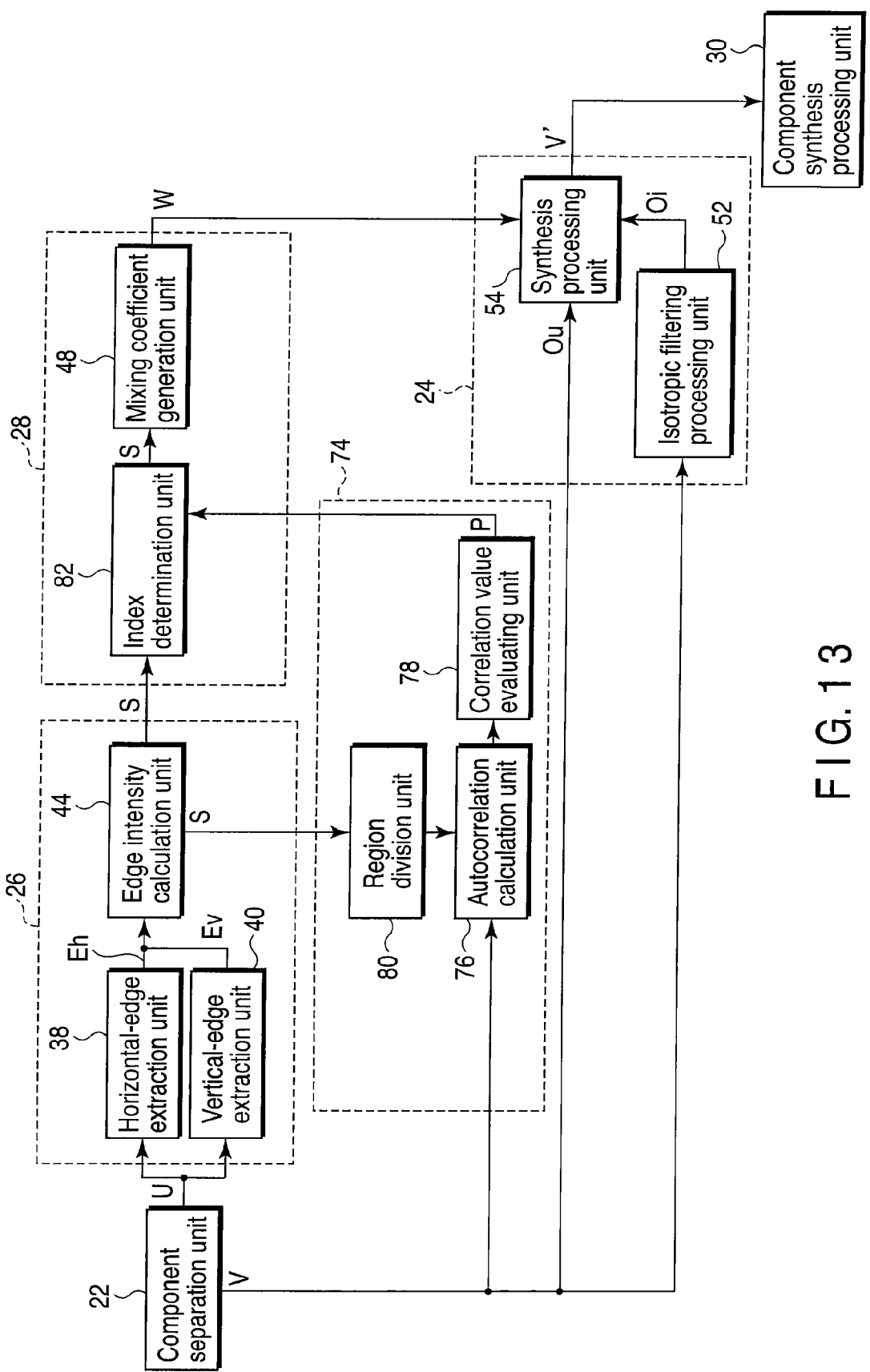
F I G. 13

| 2 | 1 | 0 | 0 | 0 |
|---|---|---|---|---|
| 1 | 8 | 3 | 0 | 0 |
| 0 | 3 | 12| 3 | 0 |
| 0 | 0 | 3 | 8 | 1 |
| 0 | 0 | 0 | 1 | 2 |

IMAGE PROCESSING DEVICE, PROGRAM RECORDING MEDIUM, AND IMAGE ACQUISITION APPARATUS

CROSS REFERENCE TO RELATED APPLICATIONS

This is a Continuation Application of PCT Application No. PCT/JP2008/062350, filed Jul. 8, 2008, which was published under PCT Article 21(2) in Japanese.

This application is based upon and claims the benefit of priority from prior Japanese Patent Application No. 2007-181322, filed Jul. 10, 2007, the entire contents of which are incorporated herein by reference.

BACKGROUND OF THE INVENTION

1. Field of the Invention

The present invention relates to a reduction in noise (that is, a fluctuation component) in an image signal. In particular, the present invention relates to an image processing device configured to process an image by separating the image into a plurality of components, a program recording medium in which an image processing program is recorded, and an image acquisition apparatus that uses the image processing device.

2. Description of the Related Art

Jpn. Pat. Appln. KOKAI Publication No. 2001-157057 discloses a technique to estimate the amount of noise contained in an image and control the frequency characteristics of filtering in accordance with the estimated noise amount, thus reducing the noise contained in the image. According to the technique, when the amount of luminance noise is defined as N and a signal level converted into a density value is defined as D, the noise amount is estimated based on the function $N=ab^{cD}$. Here, a, b, and c are constant terms and are statically given.

BRIEF SUMMARY OF THE INVENTION

According to a first aspect of the present invention, there is provided an image processing device comprising:

a component separation section configured to separate an original image signal into a plurality of components including a first component that is a framework component and a second component obtained from a residue corresponding to the original image signal from which the first component has been excluded;

an edge information acquisition section configured to obtain edge information from the first component included in the plurality of components;

a fluctuation-component reduction section configured to reduce a fluctuation component at least of the second component included in the plurality of components;

a parameter acquisition section configured to acquire a parameter for the fluctuation-component reduction section based on the edge information obtained by the edge information acquisition section; and a component synthesis section configured to synthesize the first component and the component other than the first component in which the fluctuation component has been reduced by the fluctuation-component reduction section.

According to a second aspect of the present invention, there is provided an image acquisition apparatus comprising:

an image acquisition section configured to convert an optical image into an image signal;

a component separation section configured to separate the image signal into a plurality of components including a first component that is a framework component and a second component obtained from a residue corresponding to the image signal from which the first component has been excluded;

an edge information acquisition section configured to obtain edge information from the first component included in the plurality of components;

a fluctuation-component reduction section configured to reduce a fluctuation component at least of the second component included in the plurality of components;

a parameter acquisition section configured to acquire a parameter for the fluctuation-component reduction section based on the edge information obtained by the edge information acquisition section; and a component synthesis section configured to synthesize the first component and the component other than the first component in which the fluctuation component has been reduced by the fluctuation-component reduction section.

According to a third aspect of the present invention, there is provided a program recording medium in which a program is recorded, the program allowing a computer to:

separate an original image signal into a plurality of components including a first component that is a framework component and a second component obtained from a residue corresponding to the original image signal from which the first component has been excluded;

obtain edge information from the first component included in the plurality of components resulting from the separation;

acquire a parameter for fluctuation-component reduction based on the edge information;

in accordance with the parameter, reduce a fluctuation component at least of the second component included in the plurality of components resulting from the separation; and synthesize the first component and the component other than the first component and in which the fluctuation component has been reduced.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing the configuration of an image acquisition apparatus according to a first embodiment of the present invention;

FIG. 3A is a diagram illustrating a filter used by a horizontal-edge extraction unit;

FIG. 3B is a diagram illustrating a filter used by a vertical-edge extraction unit;

FIG. 4A is a diagram illustrating an example of a filter coefficient output by a filter coefficient selection unit;

FIG. 4B is a diagram illustrating another example of the filter coefficient output by the filter coefficient selection unit;

FIG. 7 is a diagram illustrating the concept of component separation and synthesis;

FIG. 13 is a diagram showing the configuration of an image processing device according to the fifth embodiment of the present invention which device is used in the image acquisition apparatus according to the fifth embodiment;

DETAILED DESCRIPTION OF THE INVENTION

Figure 2:
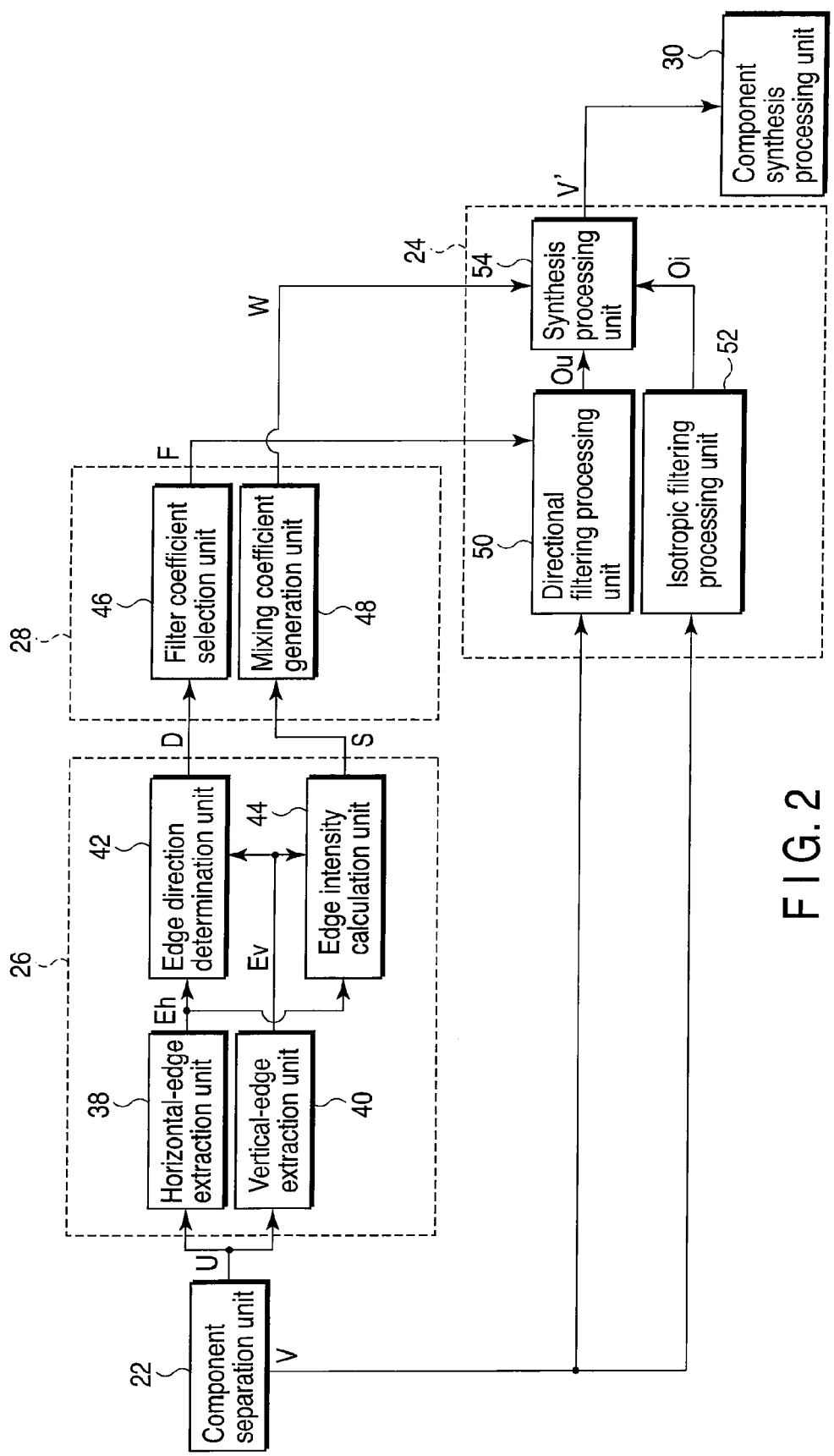
FIG. 2 is a diagram showing the configuration of an image processing device according to the first embodiment of the present invention which device is used in the image acquisition apparatus according to the first embodiment.

The best mode for carrying out the present invention will be described below with reference to the drawings.

First Embodiment

As shown in FIG. 1, an image acquisition apparatus according to a first embodiment of the present invention includes an image acquisition section including, for example, a lens 10, a solid-state image sensor 12, an image acquisition signal processing unit 14, an analog-to-digital conversion unit 16, and a digital signal processing unit 18. That is, an image signal passes through the lens 10 and is converted into an electric signal by the solid-state image sensor 12. The electric signal is input to the image acquisition signal processing unit 14. The image acquisition signal processing unit 14 executes signal processing such as CDS (Correlated Double Sampling)/differential sampling, adjustment of an analog gain on the input image signal. The image signal subjected to the signal processing is thereafter converted into a digital signal by the analog-to-digital conversion unit 16. The digital signal is further converted into a digital image signal of a predetermined gray level by the digital signal processing unit 18.

An output from the digital signal processing unit 18 is input to an image processing device 20 according to the first embodiment of the present invention. The image processing device 20 includes a component separation unit 22 functioning as, for example, a component separation section, a noise-reduction processing unit 24 functioning as, for example, a fluctuation-component reduction section, an edge information acquisition unit 26 function as, for example, an edge information acquisition section, a noise-reduction processing parameter acquisition unit 28 functioning as, for example, a parameter acquisition section, and a component synthesis processing unit 30 functioning as, for example, a component synthesis section.

That is, the component separation unit 22 separates an original image signal I that is an output signal from the digital signal processing unit 18, into a first component U and a second component V. The first component U is a framework component (geometric image structure) of the original image signal I containing a flat component (slowly fluctuating component) and an edge component. The first component U is input to the edge information acquisition unit 26 and the component synthesis processing unit 30. The second component V is a residual component corresponding to the original image signal I from which the first component U has been excluded, and contains a small structure component like a texture as well as noise. The second component V is input to the noise-reduction processing unit 24. The original image signal I is a monochromatic signal. Thus, the first component U and the second component V into which the original image signal I is separated are both luminance components.

Here, for simplification, by way of example, the original image signal I is separated into the two components, that is, the first component, which is a framework component, and the second component, which is a residual component. However, the original image signal I may be separated into at least three components. A method for component separation will be described below in detail.

The edge information acquisition unit 26 and the noise-reduction processing parameter acquisition unit 28 acquire a predetermined noise-reduction processing parameter PA in accordance with edge information EI contained in the first component U, and transmits the noise-reduction processing parameter PA to the noise-reduction processing unit 24. The noise-reduction processing unit 24 uses the second component V obtained by the component separation unit 22 as an input signal to execute a predetermined noise-reduction process described below. The noise-reduction processing unit 24 thus reduces the noise (fluctuation component) in the second component V, and outputs the result as a corrected second component V'. The component synthesis processing unit 30 synthesizes the first component U and the corrected second component V' to obtain an output signal.

The output signal from the component synthesis processing unit 30, which corresponds to an output from the image processing device 20, is transmitted to a display unit 32 and to a recording medium 36 via a compression circuit 34.

An example of the component separation technique of the compression separation unit 22 is additive separation that facilitates separation and synthesis as described below. In this case, the component synthesis processing unit 30 synthesizes the first component and the second component in a predetermined mixture ratio.

The above-described processing is executed by the operation of the processing units under the control of a system controller (not shown in the drawings).

Now, with reference to FIG. 2, the noise-reduction process will be described in detail.

The noise-reduction process is based on a low pass filter process executed by the noise-reduction processing unit 24. In this case, filtering is performed along an edge direction obtained by the edge information acquisition unit 26 and the noise-reduction processing parameter acquisition unit 28. Thus, only the noise component is effectively reduced, whereas the edge component, which expresses the structure of the image, is prevented from being reduced.

As shown in FIG. 2, the edge information acquisition unit 26 includes a horizontal-edge extraction unit 38, a vertical-edge extraction unit 40, an edge direction determination unit 42, and an edge intensity calculation unit 44. Furthermore, the noise-reduction processing parameter acquisition unit 28 includes a filter coefficient selection unit 46 and a mixing coefficient generation unit 48. The noise-reduction processing unit 24 includes a directional filtering processing unit 50 functioning as, a filtering section, an isotropic filtering processing unit 52 functioning as, for example, a filtering section, and a synthesis processing unit 54 functioning as, for example, an intermediate-component synthesis section.

Here, the horizontal-edge extraction unit 38 applies a filter shown in FIG. 3A to the first component U obtained by the above-described component separation unit 22. The horizontal-edge extraction unit 38 calculates the absolute value of an output from the filter to output a horizontal-edge component Eh. Furthermore, the vertical-edge extraction unit 40 applies a filter shown in FIG. 3B to the first component U obtained by the above-described component separation unit 22. The vertical-edge extraction unit 40 calculates the absolute value of an output from the filter and outputs a vertical-edge component Ev.

The edge direction determination unit 42 uses the horizontal edge component Eh and the vertical edge component Ev as an input to calculate an edge direction index D indicative of an edge direction based on:

$$D = Eh - Ev \qquad (1)$$

Furthermore, the edge intensity calculation unit 44 uses the horizontal edge component Eh and the vertical edge component Ev as an input to calculate an edge intensity index S indicative of an edge intensity based on:

$$S = \sqrt{Eh^2 + Ev^2} \qquad (2)$$

Based on the edge direction index D calculated by the edge direction determination unit 42 as a piece of the edge information EI, the filter coefficient selection unit 46 selects a filter coefficient F from those shown in FIGS. 4A and 4B and outputs the filter coefficient F to a directional filtering processing unit 50. Here, when D>0, the filter coefficient shown in FIG. 4A is output. Otherwise, the filter coefficient shown in FIG. 4B is output.

Figures 5, 6:
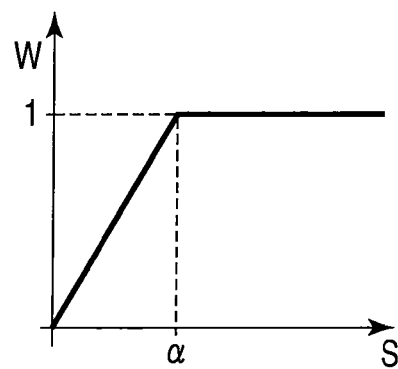
FIG. 5 is a diagram showing the relationship between a mixing coefficient W and an edge intensity index S.
FIG. 6 is a diagram illustrating a filter coefficient used by an isotropic filtering processing unit.

Based on the edge intensity index S calculated by the edge intensity calculation unit 44 as a piece of the edge information EI, the mixing coefficient generation unit 48 generates a mixing coefficient W. FIG. 5 shows the relationship between the mixing coefficient W and the edge intensity index S. In a region where the edge component, contained in the first component U, exhibits a lower intensity, the mixing coefficient W increases consistently with the intensity of the edge component. In a region where the edge component exhibits a higher intensity, the mixing coefficient W has a constant value. In FIG. 5, a denotes an adjusting parameter that is a value used to adjust the intensity of the directional filter.

The directional filtering processing unit 50 functions as, for example, a directional filtering section. The directional filtering processing unit 50 uses the filter coefficient F provided by the filter coefficient selection unit 46 to execute a filter process on the second component V obtained by the component separation unit 22. The directional filtering processing unit 50 thus outputs the resulting output Ou to the synthesis processing unit 54.

The isotropic filtering processing unit 52 uses a filter coefficient shown in FIG. 6 to execute a filter process on the second component V obtained by the component separation unit 22. The isotropic filtering processing unit 52 outputs the resulting output Oi to the synthesis processing unit 54.

The synthesis processing unit 54 synthesizes the output Ou from the directional filtering processing unit 50 and the output Oi from the isotropic filtering processing unit 52 in accordance with the following expression to obtain an output O that is the corrected second component V'.

$$O = WOu + (1-W)Oi \qquad (3)$$

The filter process is thus executed along the edge direction in accordance with the intensity of the edge component to obtain a signal with the edge component preserved and with the noise (fluctuation component) reduced.

Now, the component separation and synthesis will be described in detail.

When the first component U is extracted from the input image, a process of retaining a flat component and a structural element is used as a basis. For example, the following process is used: low pass separation based on a linear filter or adaptive smoothing based on a median filter or a morphology filter. Alternatively, separation based on a bounded variation function described below is utilized.

A waveform diagram (a) in FIG. 7 shows a one-dimensionally expressed original signal component of an image which contains noise.

A waveform diagram (b) in FIG. 7 shows the first component U, which is a framework component obtained by the component separation unit 22. The method for component separation will be described in detail. A waveform (c) in FIG. 7 shows the second component V, which is a texture component as a residual component obtained by the component separation unit 22. Here, for simplification, the residue corresponding to the original signal from which the first component U and the second component V are excluded is assumed to be zero.

A waveform (d) in FIG. 7 indicates the results of the above-described filter process executed on the second component V.

The component synthesis processing unit 30 synthesizes the first component U and the second component V corrected by the noise-reduction processing unit 24 in a predetermined ratio. A waveform (e) in FIG. 7 corresponds to this and shows the results of synthesis of the signal in the waveform diagram (d) and the signal in the waveform diagram (b) in the ratio of 1:1. The mixture ratio for the synthesis may be optionally set.

For color image signals, the above-described filter process is executed for each color component of the second component V.

In the present invention, the technique for component separation is not limited to such a method as described in the first embodiment. The present invention is applicable to any of various separation methods as described below.

Now, component separation and noise reduction for images will be described in detail.

Here, additive separation will be described by way of example.

In the additive separation, the original image signal I is expressed by the sum of the first component U and the second component V as in:

$$I = U + V \qquad (4)$$

A separation method using a bounded variation function and a norm will be described below.

The first component U is a framework component, and the second component V is a residue. To separate the components, such the Aujol-Aubert-Blanc-Feraud-Chambolle ($A^2BC$) model as given by Expression (5) is used. The details of the $A^2BC$ model are disclosed in Jean-Francois Aujol, Guy Gilboa, Tony Chan & Stanley Osher, Structure-Texture Image Decomposition-Modeling, Algorithms, and Parameter Selection, International Journal of Computer Vision, Volume 67, Issue 1 (April 2006) Pages: 111-136 Year of Publication: 2006.

$$\inf_{U,V \in G_\mu} \left\{ J(U) + \frac{1}{2\alpha} \|I - U - V\|_{L2}^2 \right\} \quad (5)$$

$$\alpha > 0, \mu > 0, G_\mu = \{V \in G \mid \|V\|_G \leq \mu\}$$

Here, the property of the first component U determined to be the optimum solution is modeled as a Bounded Variation Function Space (BV) composed of a plurality of "small partial regions with a smooth variation in luminance" which are partitioned by discontinuous boundaries. The energy of the first component U is defined by a TV (Total Variation) norm J(U) in:

$$J(U) = \int \|\nabla U\| dxdy \quad (6)$$

On the other hand, a function space for the second component V, which is a texture component in Expression (4) described above, is modeled as a vibration function space G. The vibration function space G is a space for a function expressed by vibration generation functions $g_1$ and $g_2$ as shown in Expression (7). The energy of the vibration function space G is defined as a G norm in Expression (8).

$$V_{(x,y)} = \partial_x g_{1(x,y)} + \partial_x g_{2(x,y)}; g_1, g_2 \in L_\infty(R^2) \quad (7)$$

$$\|V\|_G = \inf_{g1,g2} \{\|(g_1)^2 + (g_2)^2\|_{L\infty}; V = \partial_x g_1 + \partial_x g_2\} \quad (8)$$

A separation problem for the original image signal I is formulated as a variation problem that minimizes an energy functional (Expression (5) described above). This variation problem can be solved by Chambolle's Projection method. For color image signals, the separation is independently executed for each primary color component.

An input signal is assumed to be the original image signal I to which Gaussian noise is added. The present separation method is characterized in that the second component V, which is a texture component, is affected by noise, whereas the first component U, which is a framework image, is almost not affected by the noise, thus allowing a geometric image structure to be extracted without blurring the edges.

Thus, the edge information acquisition unit 26 extracts edge information EI contained in the image, from the first component U, which is a framework image. In accordance with the edge information EI obtained, the noise-reduction processing unit 24 applies a noise removal method to the second component V, which is a texture component. The component synthesis processing unit 30 then restores the image. The edge information EI obtained from the first component U, which is a framework, is not affected by noise. Thus, the noise (fluctuation component) in the flat portion of the image can be effectively reduced without blurring the edges, expressing the geometric structure of the image.

Other examples of the additive separation method are as follows.

Example 1 the method in which the first component U is a low-order component resulting from orthogonal basis expansion of the original image signal and the second component V is a residue corresponding to the original image signal I from which the first component U has been excluded.

Example 2 the method in which the first component U is the result of a median filter process executed on the original image signal I and the second component V is the residue corresponding to the original image signal I from which the first component U has been excluded.

Example 3 the method in which the first component U is the result of application of a multivalued morphology filter to the original image signal I and the second component V is the residue corresponding to the original image signal I from which the first component U has been excluded.

Example 4 the method in which the first component U is the result of a reduction process and the subsequent enlargement process executed on the original image signal I and the second component V is the residue corresponding to the original image signal I from which the first component U has been excluded.

Example 5 the method in which the first component U is the result of application of a Bilateral Filter to the original image signal I and the second component V is the residue corresponding to the original image signal I from which the first component U has been excluded.

These methods, like the above-described noise-reduction technique, allow the application of the method of reducing the noise in the second component V based on the edge information EI from the first component U.

As described above, according to the first embodiment, the noise-reduction process is executed based on the edge information EI extracted from the first component U obtained by component separation and including a slowly fluctuating component and an edge component. The first embodiment can thus provide a noise-reduction process with the edge component preserved and with image quality improved.

The first embodiment can thus provide an image processing device and an image acquisition apparatus which enable a reduction in noise (fluctuation component) contained in an image without degrading the image.

Second Embodiment

Figure 8:
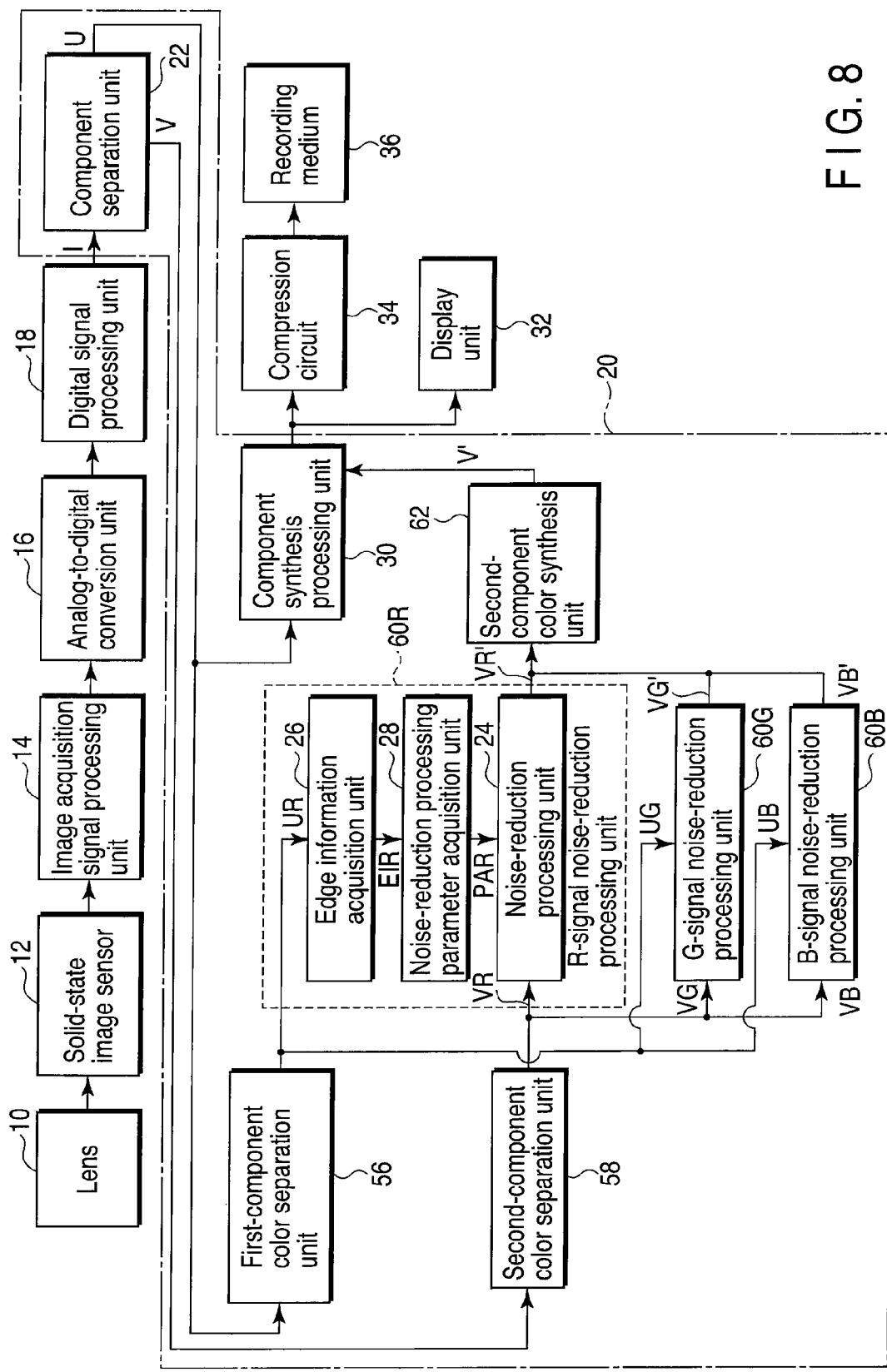
FIG. 8 is a diagram showing the configuration of an image acquisition apparatus according to a second embodiment of the present invention.

A second embodiment deals with full colors, and a solid-state image sensor 12 thus deals with the full colors. Furthermore, as shown in FIG. 8, an image processing device 20 according to the second embodiment includes a component separation unit 22, a first-component color separation unit 56, a second-component color separation unit 58, an R-signal noise-reduction processing unit 60R, a G-signal noise-reduction processing unit 60G, a B-signal noise-reduction processing unit 60B, and a second component color synthesis unit 62.

Here, the first-component color separation unit 56 further separates a first component U resulting from separation by the component separation unit 22, into signals UR, UG, and UB for three colors R, G, and B. The second-component color separation unit 58 further separates a second component V resulting from the separation by the component separation unit 22, into signals VR, VG, and VB for the three colors R, G, and B.

The R-signal noise-reduction processing unit 60R, the G-signal noise-reduction processing unit 60G, and the B-signal noise-reduction processing unit 60B are provided in association with the signals for R, G, and B. Each of the noise-reduction processing units is the same as the arrangement including the edge information acquisition unit 26, noise-reduction processing parameter acquisition unit 28, and noise-reduction processing unit 24 according to the above-described first embodiment. For simplification, FIG. 8 typically shows only the R-signal noise-reduction processing unit 60R. That is, for example, the R-signal noise-reduction processing unit 60R acquires edge information EIR from an R-signal UR for the first component U. The R-signal noise-reduction processing unit 60R uses a noise-reduction processing parameter PAR based on the edge information EIR to execute a noise-reduction process on an R-signal VR for the second component V.

The second-component color synthesis unit 62 synthesizes signals VR', VG', and VB' for the colors R, G, and B of the second component V which are subjected to the noise-reduction process by the R-, G-, and B-signal noise-reduction processing units 60R, 60G, and 60B. The second-component color synthesis unit 62 then outputs the resultant corrected second component V' to the component synthesis processing unit 30.

The noise-reduction processing units 60R, 60G, and 60B corresponding to the respective color signals independently executes the above-described noise-reduction process on the respective color components.

The second embodiment is otherwise as described above in the first embodiment.

The solid-state image sensor 12 for the full colors may be based on a single plate scheme or a multiple plate scheme.

As described above, according to the second embodiment, the noise-reduction process is executed for each color signal based on the edge information EI (EIR, EIG, and EIB) for each color signal extracted from the first component U obtained by component separation and including a slowly fluctuating component and an edge component. The second embodiment can thus provide a noise-reduction process with the edge component preserved and with image quality improved.

Third Embodiment

Figure 9:
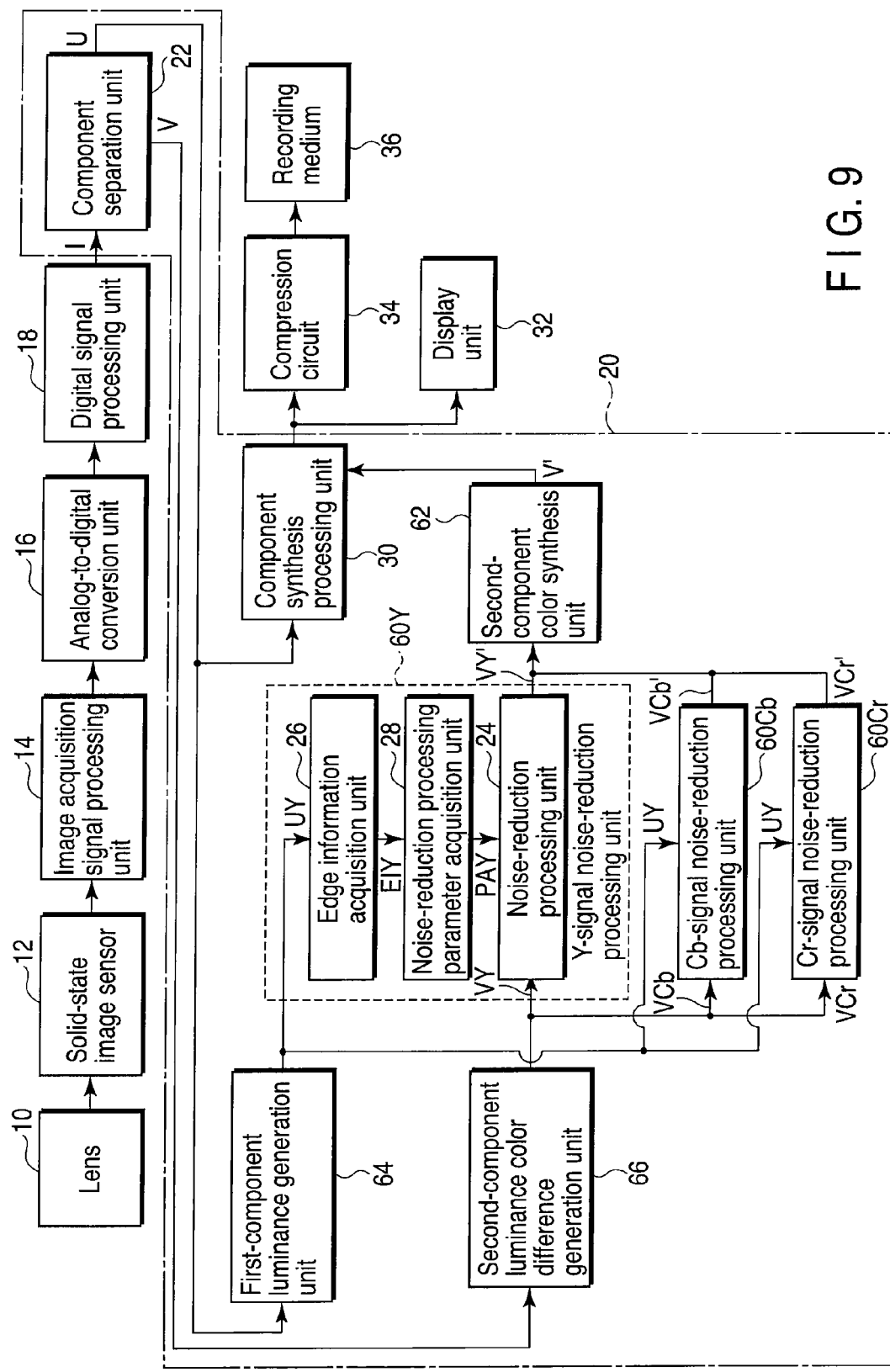
FIG. 9 is a diagram showing the configuration of an image acquisition apparatus according to a third embodiment of the present invention.

A third embodiment deals with full colors, and a solid-state image sensor 12 thus deals with the full colors. Furthermore, as shown in FIG. 9, an image processing device 20 according to the third embodiment includes a first-component luminance generation unit 64 function as, for example, a luminance signal generation section, a second-component luminance color difference generation unit 66, a Y-signal noise-reduction processing unit 60Y, a Cb-signal noise-reduction processing unit 60Cb, a Cr-signal noise-reduction processing unit 60Cr, and a second component color synthesis unit 62.

Here, the first-component luminance generation unit 64 generates a Y-signal UY from a first component U resulting from separation by a component separation unit 22. The second-component luminance color difference generation unit 66 further separates a second component V resulting from separation by the component separation unit 22, into signals VY, VCb, and VCr for three colors Y, Cb, and Cr.

The Y-signal noise-reduction processing unit 60Y, the Cb-signal noise-reduction processing unit 60Cb, and the Cr-signal noise-reduction processing unit 60Cr are provided in association with the signals VY, VCb, and VCr for Y, Cb, and Cr. Each of the noise-reduction processing units is the same as the arrangement including the edge information acquisition unit 26, noise-reduction processing parameter acquisition unit 28, and noise-reduction processing unit 24 according to the above-described first embodiment. For simplification, FIG. 9 typically shows only the Y-signal noise-reduction processing unit 60Y.

The third embodiment is characterized in that edge information EIY contained in the first component U is extracted from the Y-signal UY for the first component U and used to reduce the noise in each of the color components Y, Cb, and Cr. For example, the Cb-signal noise-reduction processing unit 60Cb acquires the edge information EIY from the Y-signal UY for the first component U and uses a noise-reduction processing parameter PACb based on the edge information EIY to execute a noise-reduction process on the Cb-signal VCb for the second component V. This is because the human visual sense is characterized in that a geometric structure contained in a luminance component more significantly affects that contained in a color difference component. In this connection, it is only necessary to acquire the edge information EIY from the Y-signal. Thus, instead of including the edge information acquisition unit 26 for each color signal as shown in FIG. 9, the apparatus may includes a single edge information acquisition unit 26 configured to supply the edge information EIY from the Y-signal to the noise-reduction processing units 60Y, 60Cb, and 60Cr for the respective color signals.

The second-component color synthesis unit 62 synthesizes signals VY', VCb', and VCr' for the colors Y, Cb, and Cr of the second component V which are subjected to the noise-reduction process by the Y-, Cb-, and Cr-signal noise-reduction processing units 60Y, 60Cb, and 60Cr. The second-component color synthesis unit 62 then outputs the resultant corrected second component V' to the component synthesis processing unit 30.

The first-component luminance generation unit 64 and the second-component luminance color difference generation unit 66 convert a colored original image signal I into the luminance signal Y and the color difference signals Cb and Cr in accordance with:

$$\begin{cases} Y = 0.29900R + 0.58700G + 0.11400B \\ Cb = -0.16874R - 0.33126G + 0.50000B \\ Cr = 0.50000R - 0.41869G - 0.08131B \end{cases} \quad (9)$$

The third embodiment is otherwise as described above in the first embodiment.

The present embodiment uses full color channels in order to obtain a luminance signal from an analog-to-digital-converted signal immediately after the conversion. However, alternatively, a signal may be used which is obtained by interpolating a G channel most properly reflecting the luminance signal. Furthermore, instead of the color difference signals Cb and Cr, an (R-G)-signal and a (B-G)-signal may be used.

The solid-state image sensor 12 compatible with the full colors may be based on the single plate scheme or the multiple plate scheme.

As described above, according to the third embodiment, the noise-reduction process is executed based on the edge information EIY contained in the luminance component, which most significantly affects the image quality in connection with the properties of the human visual sense. The third embodiment can thus provide a noise-reduction process with image quality improved.

Fourth Embodiment

Figure 10:
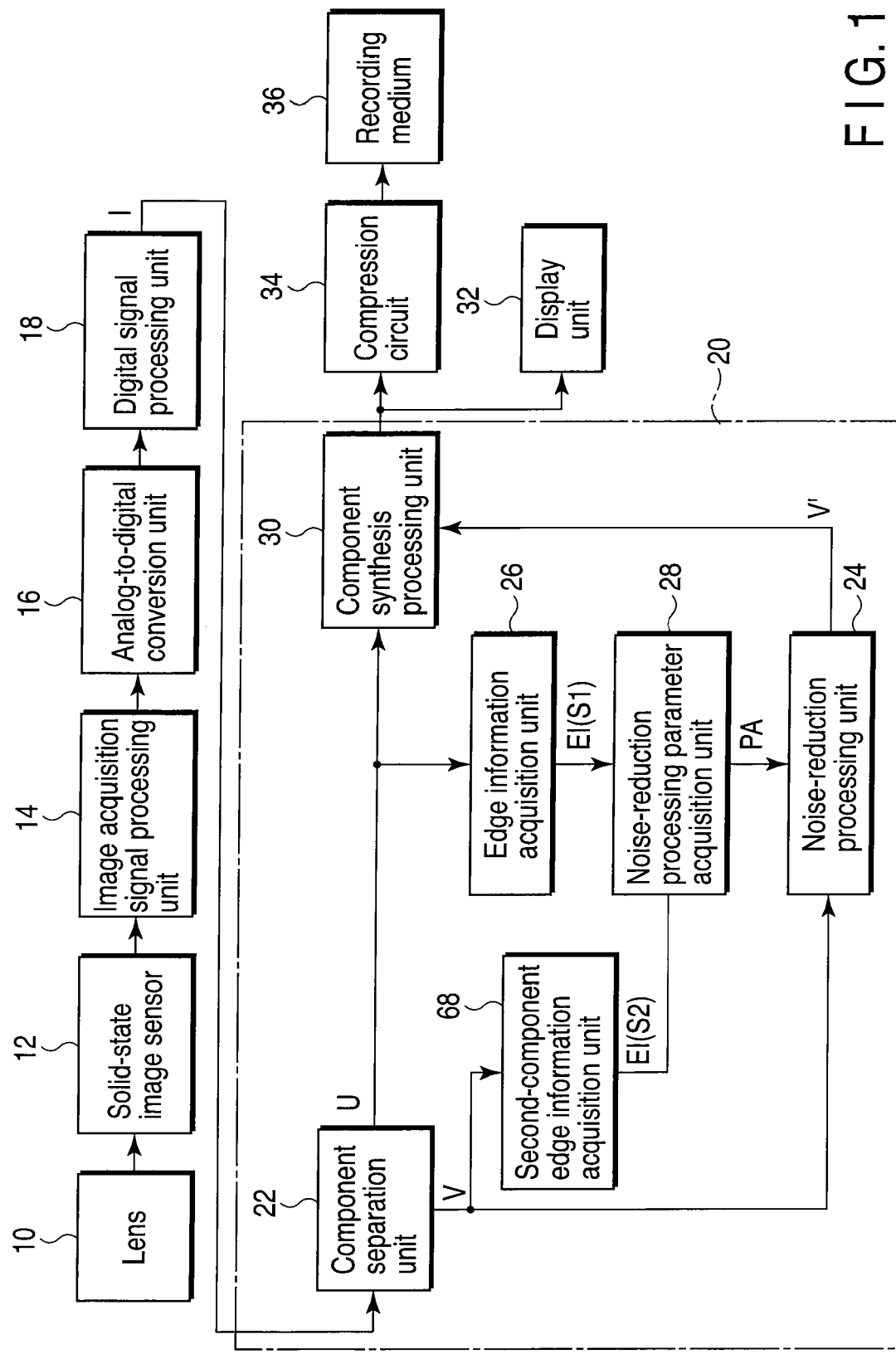
FIG. 10 is a diagram showing the configuration of an image acquisition apparatus according to a fourth embodiment of the present invention.
Figure 11:
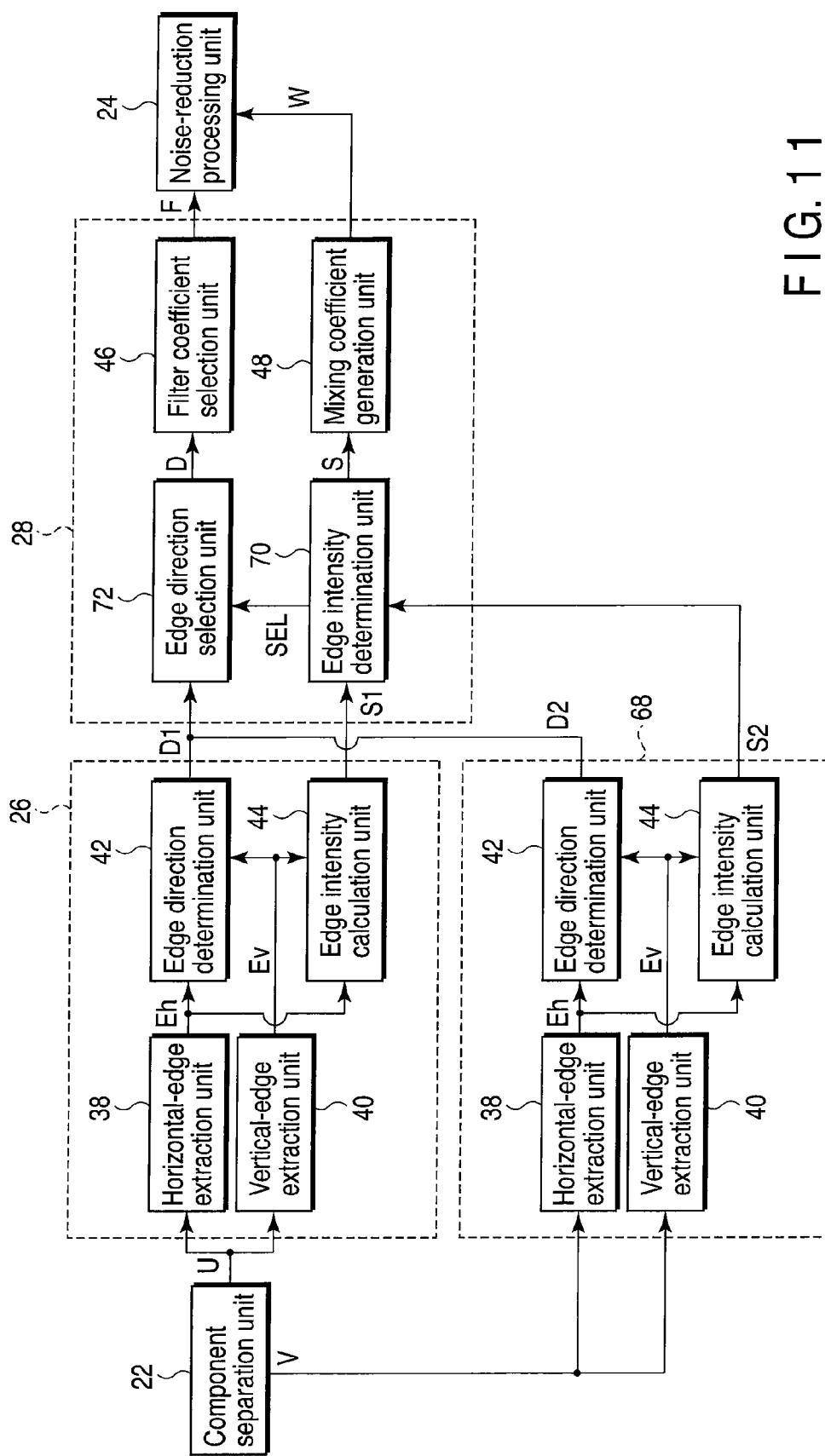
FIG. 11 is a diagram showing the configuration of an image processing device according to the fourth embodiment of the present invention which device is used in the image acquisition apparatus according to the fourth embodiment.

A fourth embodiment is characterized by having not only the configuration of the above-described first embodiment but also a second-component edge information acquisition unit 68 function as, for example, a second edge information acquisition section as shown in FIG. 10. As shown in FIG. 11, the configuration of the second-component edge information acquisition unit 68 is the same as that of the edge information acquisition unit 26 according to the above-described first embodiment. Furthermore, in the present embodiment, a noise-reduction processing parameter acquisition unit 28 additionally includes an edge intensity determination unit 70 and an edge direction selection unit 72 as shown in FIG. 11.

Here, the edge intensity determination unit 70 compares an edge intensity index S (hereinafter referred to as an edge intensity index S1) output by the edge information acquisition unit 26 with an edge intensity index S (hereinafter referred to as an edge intensity index S2) output by the second edge information acquisition unit 68. The edge intensity determination unit 70 then outputs the larger of the two edge intensity index values to a mixing coefficient generation unit 48 as an intensity index. Furthermore, the edge intensity determination unit 70 outputs information indicating the component corresponding to one of the edge intensity index values S1 and S2 which has been determined to be larger as a result of the comparison, to the edge direction selection unit 72 as a selection signal SEL. Then, in accordance with the selection signal SEL, the edge direction selection unit 72 selectively outputs an edge direction index D1 from the edge information acquisition unit 26 and an edge direction index D2 from the second-component edge information acquisition unit 68 to a filter coefficient selection unit 46. As a result, one of the pieces of edge information EI extracted from the first component U and the second component V which has a higher edge intensity is used to generate a noise-reduction processing parameter PA.

The method for separation into a bounded variation function and a vibration function as shown in the above-described first embodiment separates the original image signal I into a framework component serving as the first component U to indicate the framework of the image and a texture component serving as the second component V to indicate a texture contained in the image. In contrast, the fourth embodiment generates a noise-reduction processing parameter PA taking into account the edge information EI attributed to the texture component contained in the second component V. Thus, the fourth embodiment enables a more accurate noise-reduction process.

Fifth Embodiment

Figure 12:
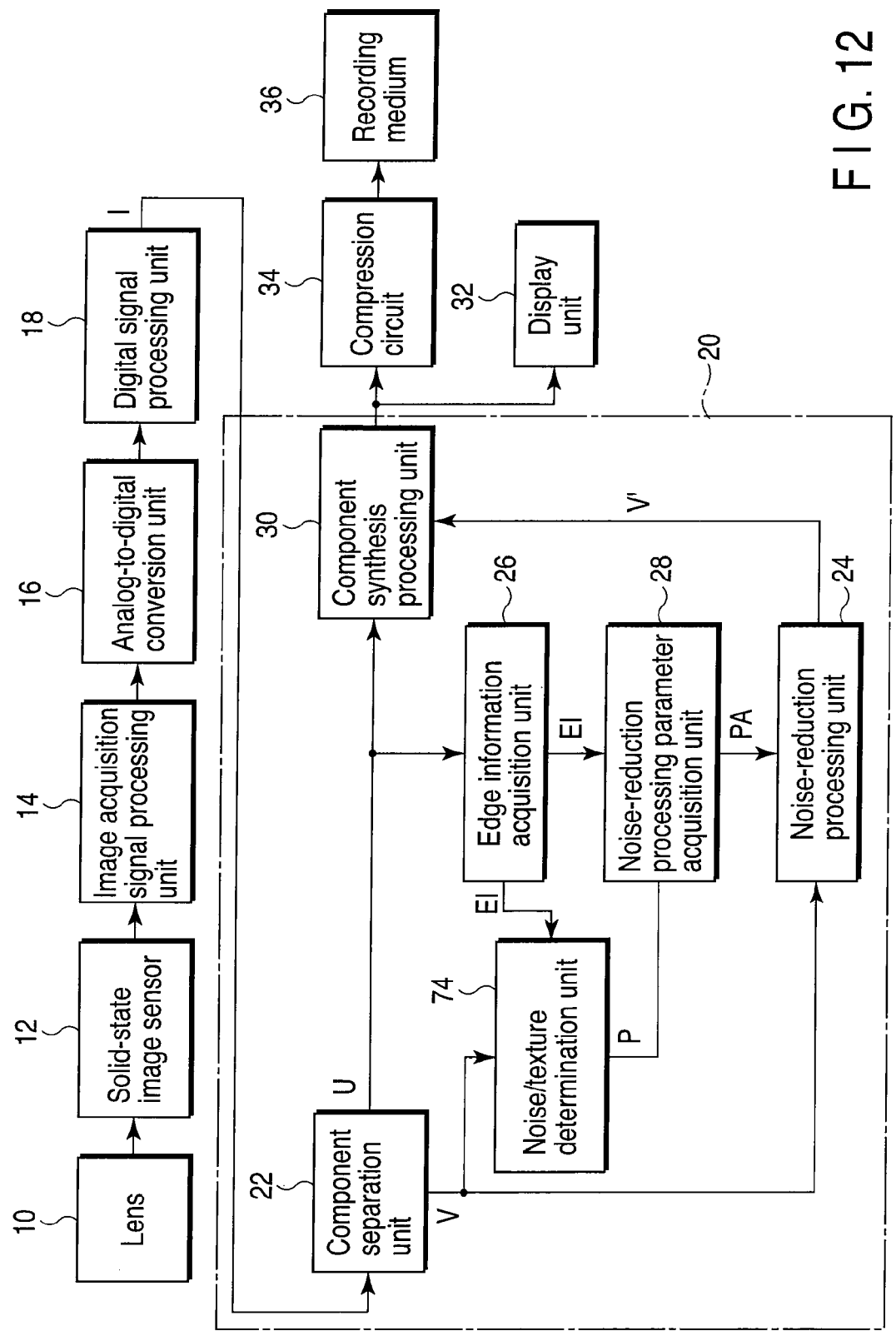
FIG. 12 is a diagram showing the configuration of an image acquisition apparatus according to a fifth embodiment of the present invention.

As shown in FIG. 12, a fifth embodiment is characterized by having not only the configuration of the above-described first embodiment but also a noise/texture determination unit 74 provided in an image processing device 20 and functioning as, for example, a second edge information acquisition section. That is, the noise/texture determination unit 74 distinguishes the texture and noise contained in a second component V from each other, and executes an intensive noise-reduction process on a region in which the noise is dominant. This allows a more accurate noise-reduction process to be achieved.

As shown in FIG. 13, the noise/texture determination unit 74 includes an autocorrelation calculation unit 76, a correlation value evaluating unit 78, and a region division unit 80. Furthermore, in the present embodiment, a noise-reduction processing parameter acquisition unit 28 includes an index determination unit 82 and a mixing coefficient generation unit 48.

Here, based on an edge intensity distribution provided by an edge intensity calculation unit 44, the region division unit 80 divides the image into a plurality of regions. The autocorrelation calculation unit 76 calculates an autocorrelation function for the second component V for each of the divisional regions provided by the region division unit 80. The correlation value evaluating unit 78 executes a peak detecting process on the autocorrelation function determined for each of the divisional regions. The correlation value evaluating unit 78 then outputs the amount of periodic signals contained in a target divisional region, as an index P.

The index P is provided to the index determination unit 82 of the noise-reduction processing parameter acquisition unit 28. The index determination unit 82 compares an edge intensity index S obtained by the edge information acquisition unit 26 and indicating the edge intensity with the index P obtained by the noise/texture determination unit 74 and indicating the amount of periodic signals. The index determination unit 82 then outputs the larger of the index values S and P to the mixing coefficient generation unit 48 as an edge intensity index S indicative of a new edge intensity. The mixing coefficient generation unit 48 generates a mixing coefficient W based on the edge intensity index S.

The mixing coefficient W is provided to a synthesis processing unit 54 of a noise-reduction processing unit 24. The synthesis processing unit 54 determines the second component V resulting from separation by the component separation unit 22 to be Ou and synthesizes Ou and an output Oi from an isotropic filtering processing unit 52 in accordance with Expression (3) described above to obtain an output O. The synthesis processing unit 54 then outputs the output O to a component synthesis processing unit 30 as a corrected second component V'.

The fifth embodiment is otherwise as described above in the first embodiment.

The method for separation into a bounded variation function and a vibration function as shown in the above-described first embodiment separates the original image signal I into a framework component serving as the first component U to indicate the framework of the image and a texture component serving as the second component V to indicate a texture contained in the image. In contrast, the fifth embodiment extracts edge information EI from the first component U, while extracting texture information from the second component V. Then, in accordance with both pieces of information, noise reduction throughput is controlled. Thus, the fifth embodiment allows the edge and texture contained in the image to be preserved, while enabling the noise (fluctuation component) contained in the image to be effectively reduced.

Sixth Embodiment

Figure 14:
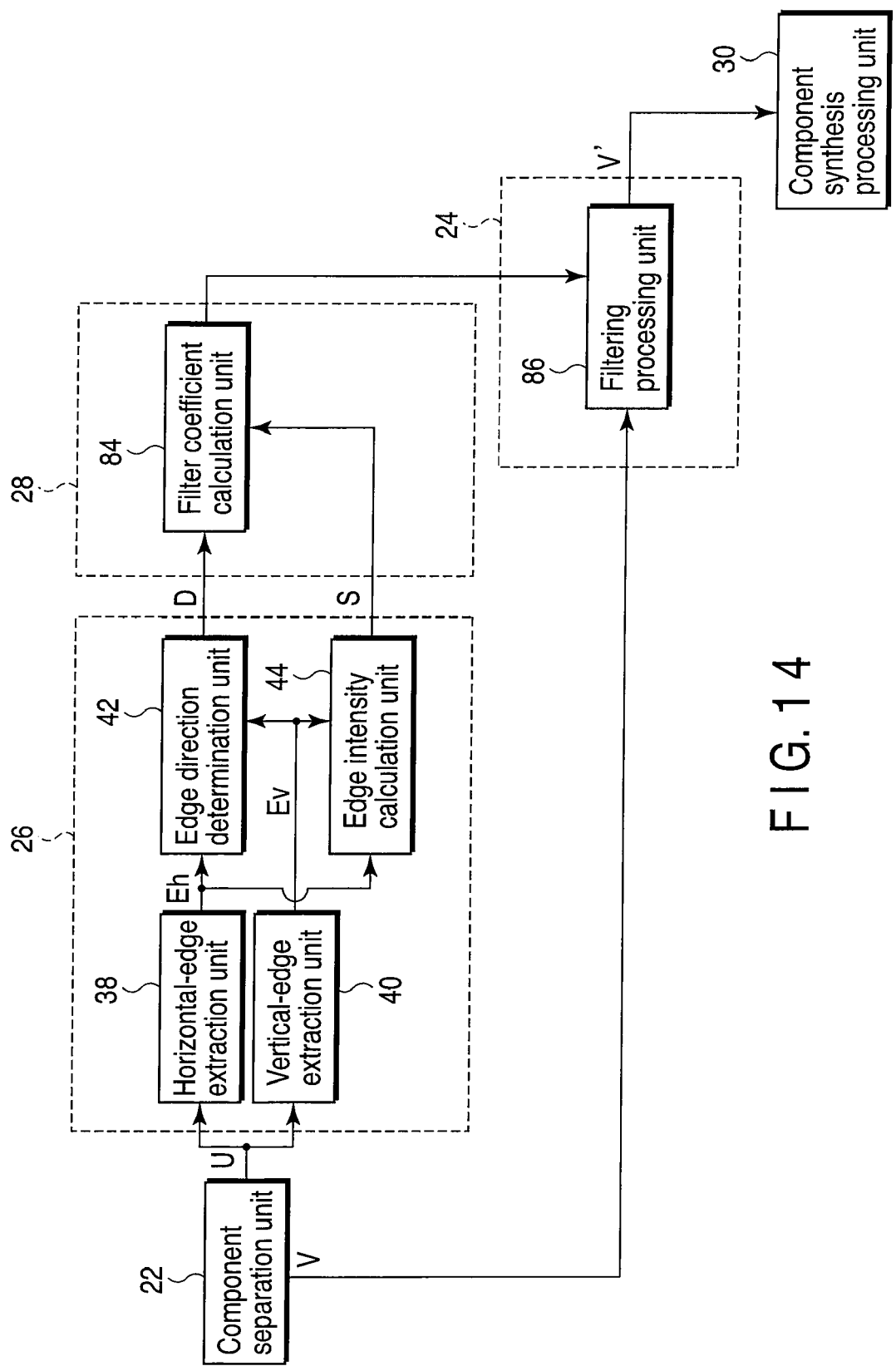
FIG. 14 is a diagram showing the configuration of an image processing device according to a sixth embodiment of the present invention which device is used in an image acquisition apparatus according to the sixth embodiment.

In a sixth embodiment, as shown in FIG. 14, a noise-reduction processing parameter acquisition unit 28 of an image processing device 20 includes a filter coefficient calculation unit 84. Furthermore, a noise-reduction processing unit 24 of the image processing device 20 includes a filtering processing unit 86 functioning as, for example, a filtering section.

That is, the sixth embodiment is characterized in that a filter coefficient forming a directional filter is calculated directly by the filter coefficient calculation unit 84. The directional filter is calculated using edge information EI obtained from a first component U by an edge information acquisition unit 26.

Figures 15A, 15B:
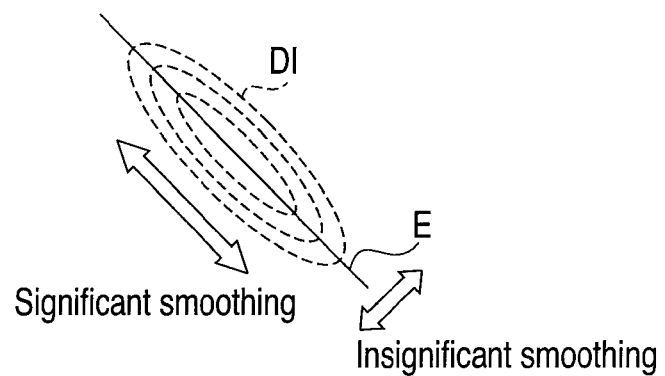
FIG. 15A is a diagram illustrating a directional filter.
FIG. 15B is a diagram showing an example of the directional filter.

As shown in FIG. 15A, the directional filter performs smoothing along the direction of an edge to reduce noise (fluctuation component). The distribution DI of filter coefficients shown in FIG. 15A is such that a weighting factor is large for a certain pixel positioned along a line indicative of an edge E and that the weighting factor corresponding to each pixel decreases with increasing distance from the position of the pixel to the edge E as shown in FIG. 15B.

A filter coefficient calculated by the filter coefficient calculation unit 84 is provided to the filtering processing unit 86 of the noise-reduction processing unit 24. The filtering processing unit 86 uses the filter coefficient provided by the filter coefficient calculation unit 84 to execute a filter process on a second component V obtained by the component separation unit 22. The filtering processing unit 86 thus outputs the resultant output Ou to a component synthesis processing unit 30 as a corrected second component V'.

The sixth embodiment is otherwise as described in the first embodiment.

An example of a method for configuring the edge information acquisition unit 26 and the filter coefficient calculation unit 84 is a unit of an anisotropic bilateral filter which calculates a weighting factor which filter is shown in Kohei Inoue, Kiichi Urahama Edge-Preserved Striped Pattern Emphasis Using a Bilateral Filter, The Institute of Electronics, Information and Communication Engineers, Shingaku Giho, vol 103, N206, 89-94 (2003.7).

As described above, according to the sixth embodiment, the filter coefficient is directly calculated, thus simplifying the configuration.

The present invention has been described based on the embodiments. However, the present invention is not limited to the above-described embodiments. Of course, variations and various applications of the embodiments are possible within the scope of the spirits of the present invention.

For example, the above-described second or third embodiment may be applied to another embodiment.

Alternatively, the functions of the above-described embodiments can be fulfilled by supplying a computer with a software program supplied by a program recording medium allowing the functions of the above-described embodiments to be fulfilled and allowing the computer to execute the program.

Figure 16:
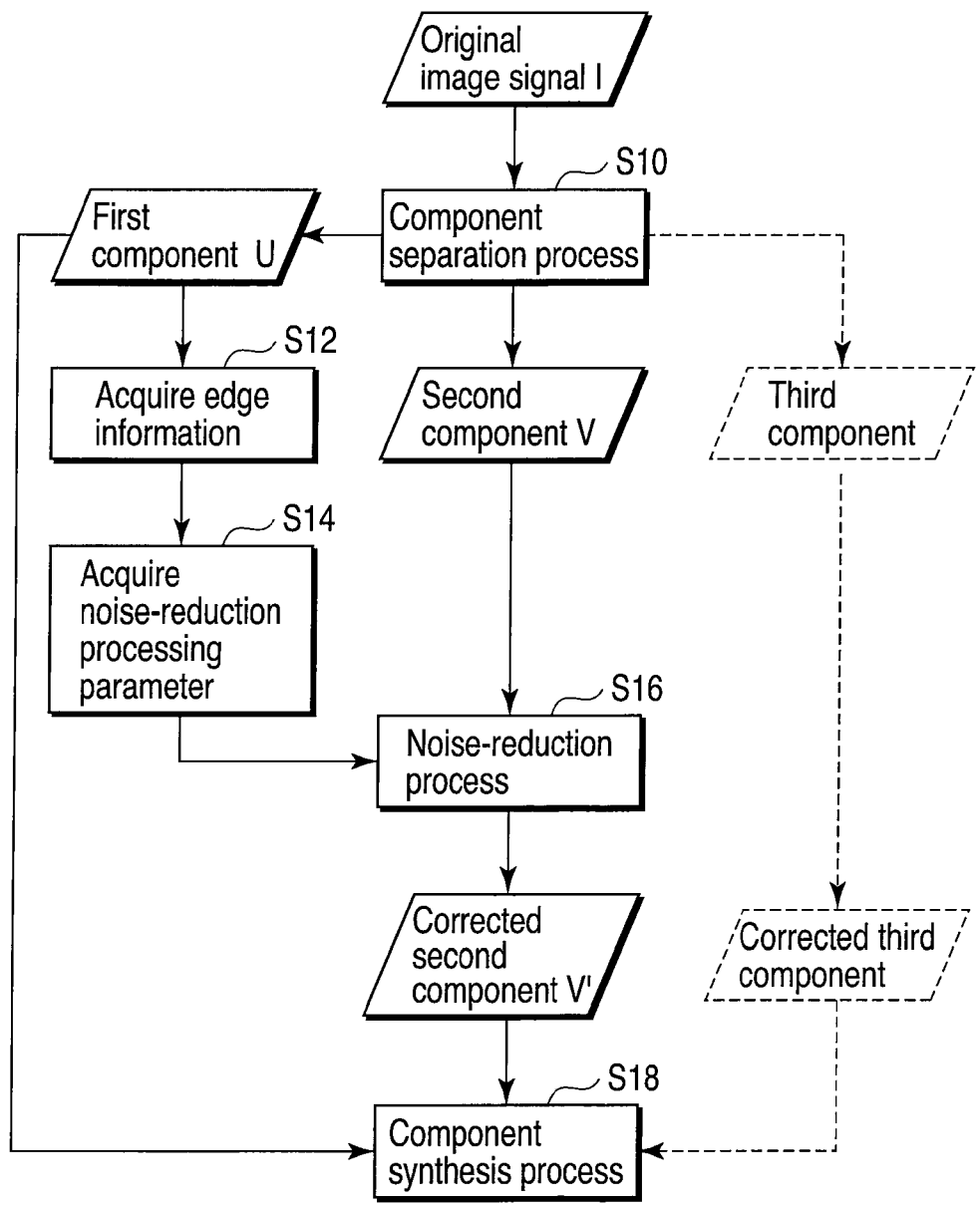
FIG. 16 is a diagram showing a flowchart of an image processing program according to the first embodiment of the present invention which program allows a computer to perform the operation of the image processing device according to the first embodiment.

FIG. 16 is a flowchart of an image processing program recorded in a program recording medium according to the first embodiment of the present invention which program allows a computer to perform the operation of the image processing device 20 according to the above-described first embodiment. In FIG. 16, processing executed to separate the original image signal I into three components is shown by a dashed line for reference. However, here, separation into two components will be described.

First, the computer separates the original image signal I into the first component U and the second component V (step S10).

Second, the computer acquires the edge information EI from the first component U (step S12). That is, the computer extracts the horizontal edge component Eh and vertical edge component Ev from the first component U.

The computer then uses the edge components to calculate the edge direction index D, indicating the edge direction, and the edge intensity index S, indicating the edge intensity; the edge direction index D and the edge intensity index S correspond to the edge information EI.

The computer then uses the acquired edge information EI to acquire a noise-reduction processing parameter PA (step S14). That is, the computer calculates a filter coefficient F based on the calculated edge direction index D and also calculates a mixing coefficient W based on the calculated edge intensity index S.

Thereafter, the computer uses the acquired noise-reduction processing parameter PA to execute a noise-reduction process on the second component V (step S16). That is, the computer uses the calculated filter coefficient F to execute a filter process on the second component V and also uses a predetermined filter coefficient to execute a filter process on the second component V. The computer further mixes the results of both filter processes based on the mixing coefficient W to obtain a corrected second component V'.

Then, the computer synthesizes the first component U and the corrected second component V' to obtain a synthesis component I with noise (fluctuation component) reduced compared to the original image signal I.

Although not particularly described, the above-described second to sixth embodiments can of course be implemented by software.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image processing device comprising:
a component separation section configured to separate an original image signal into a plurality of components including (i) a first component that is a framework component of the original image signal, the first component containing a slowly fluctuating component and an edge component, and (ii) a second component that is a residual component corresponding to the original image signal from which the first component has been excluded, the second component containing a texture component and a fluctuation component, and the fluctuation component representing noise;
an edge information acquisition section configured to obtain edge information from the first component;
a fluctuation-component reduction section configured to reduce the fluctuation component of at least the second component, and to output a corrected second component;
a parameter acquisition section configured to acquire a parameter for the fluctuation-component reduction section based on the edge information obtained by the edge information acquisition section; and
a component synthesis section configured to synthesize the first component and the corrected second component;
wherein the first component is one of (i) a low-order component resulting from orthogonal basis expansion of the original image signal, and (ii) a result of application of a Bilateral Filter to the original image signal.

2. The image processing device according to claim 1, wherein the fluctuation-component reduction section includes a filtering unit, and the parameter acquisition section is configured to change a coefficient for the filtering section based on the edge information from the first component.

3. The image processing device according to claim 2, wherein the filtering section includes a directional filtering section, and is configured to perform smoothing along an edge direction based on the edge information from the first component.

4. The image processing device according to claim 1, further comprising:
a second edge information acquisition section configured to obtain edge information at least from the second component,
wherein the parameter acquisition section is configured to acquire the parameter for the fluctuation-component reduction section based on the edge information acquired from the first component by the edge information acquisition section and the edge information acquired from the second component by the second edge information acquisition section.

5. The image processing device according to claim 4, wherein the fluctuation-component reduction section includes an intermediate-component synthesis section configured to perform synthesis using a mixing coefficient determined based on the edge information acquired from the first component by the edge information acquisition section and the edge information acquired from the second component by the second edge information acquisition section.

6. The image processing device according to claim 1, wherein the fluctuation-component reduction section includes an intermediate-component synthesis section configured to perform synthesis using a mixing coefficient determined based on the edge information acquired from the first component by the edge information acquisition section.

7. The image processing device according to claim 1, further comprising:
a second edge information acquisition section configured to obtain edge information at least from the second component,
wherein the fluctuation-component reduction section includes an intermediate-component synthesis section configured to perform synthesis using a mixing coefficient determined based on the edge information acquired from the first component by the edge information acquisition section and the edge information acquired from the second component by the second edge information acquisition section.

8. The image processing device according to claim 1, wherein:
the original image signal includes a plurality of color signals,
the edge information acquisition section is configured to acquire edge information from each color signal for the first component,
the fluctuation-component reduction section is configured to reduce a fluctuation component of each color signal for at least the second component, and
the parameter acquisition section is configured to acquire a parameter for the fluctuation-component reduction section which corresponds to each color signal for at least the second component, based on the edge information from each color signal for the first component.

9. The image processing device according to claim 1, wherein:
the original image signal includes a plurality of color signals,
the image processing device further comprises a luminance signal generation section configured to generate a luminance signal from each color signal for the first color component,
the edge information acquisition section is configured to acquire edge information from the luminance signal, and
the parameter acquisition section is configured to use the edge information from the luminance signal to acquire a parameter for the fluctuation-component reduction section which corresponds to each color signal for at least the second component.

10. The image processing device according to claim 1, wherein:
the original image signal is a monochromatic signal,
the edge information acquisition section is configured to acquire edge information from the first component based on luminance level information from the first component,
the parameter acquisition section is configured to acquire a parameter based on luminance information acquired using the luminance level information from the first component, and
the fluctuation-component reduction section is configured to reduce a fluctuation component with respect to the luminance level of the second component.

11. The image processing device according to claim 1, wherein the component separation section is configured to additively separate the original image signal into the first component and the second component.

12. An image acquisition apparatus comprising:
an image acquisition section configured to convert an optical image into an image signal;
a component separation section configured to separate the image signal into a plurality of components including (i) a first component that is a framework component of the original image signal, the first component containing a slowly fluctuating component and an edge component, and (ii) second component that is a residual component corresponding to the image signal from which the first component has been excluded, the second component containing a texture component and a fluctuation component, and the fluctuation component representing noise;
an edge information acquisition section configured to obtain edge information from the first component;
a fluctuation-component reduction section configured to reduce the fluctuation component of at least the second component and to output a corrected second component;
a parameter acquisition section configured to acquire a parameter for the fluctuation-component reduction section based on the edge information obtained by the edge information acquisition section; and
a component synthesis section configured to synthesize the first component and the corrected second component;
wherein the first component is one of (i) a low-order component resulting from orthogonal basis expansion of the original image signal, and (ii) a result of application of a Bilateral Filter to the original image signal.

13. A non-transitory program recording medium having a program stored thereon, wherein the program controls a computer to perform functions comprising:
separating an original image signal into a plurality of components including (i) a first component that is a framework component of the original image signal, the framework component containing a slowly fluctuating component and an edge component, and (ii) a second component that is a residual component corresponding to the original image signal from which the first component has been excluded, the second component containing a texture component and a fluctuation component, and the fluctuation component representing noise;

obtaining edge information from the first component;

acquiring a parameter for fluctuation-component reduction based on the edge information;

reducing the fluctuation component at least of the second component in accordance with the parameter, and outputting a corrected second component; and synthesizing the first component and the corrected second component;

wherein the first component is one of (i) a low-order component resulting from orthogonal basis expansion of the original image signal, and (ii) a result of application of a Bilateral Filter to the original image signal.

* * * * *